(12) United States Patent
Cha et al.

(10) Patent No.: US 8,086,742 B2
(45) Date of Patent: Dec. 27, 2011

(54) BROADCASTING RECEIVER AND METHOD OF INTERFACING RESOURCE INFORMATION BETWEEN A HOST DEVICE AND A POD, SENDING HOST DEVICE RESOURCE INFORMATION AND OBTAINING HOST DEVICE RESOURCE INFORMATION

(75) Inventors: Sang Hoon Cha, Seongnam-si (KR); Bong Seok Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 230 days.

(21) Appl. No.: 12/219,239

(22) Filed: Jul. 17, 2008

(65) Prior Publication Data
US 2009/0055544 A1 Feb. 26, 2009

(30) Foreign Application Priority Data
Jul. 18, 2007 (KR) .................. 10-2007-0071711

(51) Int. Cl.
*G06F 15/16* (2006.01)
(52) U.S. Cl. ...................... 709/228; 709/227
(58) Field of Classification Search .............. 725/110; 709/227, 228
See application file for complete search history.

(56) References Cited

U.S. PATENT DOCUMENTS
2006/0130110 A1* 6/2006 Cho et al. ................ 725/111

OTHER PUBLICATIONS

Society of Cable Telecommunications Engineers: "Host-POD Interface Standard-Host-POD Interface Specifcication" Internet Citation, [Online] 2003, Retrieved from the Internet: http://www.scte.org/docu ments/pdf/ansiscte282003dvs295.pdf.*
OpenCable Specifications CableCARD Interface 2.0 Specification, Aug. 3, 2006, pp. i-289, Internet Citation: http://www.cablelabs.com/opencable/downloads/specs/OC-SP-CCIF2.0-I07-060803.pdf.*

* cited by examiner

*Primary Examiner* — Ario Etienne
*Assistant Examiner* — Hee Kim
(74) *Attorney, Agent, or Firm* — McKenna Long & Aldridge LLP

(57) ABSTRACT

A broadcasting receiver and method of interfacing resource information between a host device and a POD, sending host device resource information and obtaining host device resource information are disclosed. A POD sends a resource information requesting message. And a host device receives the resource information requesting message and responds with a resource information message including a resource identifier defined in a resource information table which includes information indicating whether the host device supports A-mode. Using a "conditional access" feature provided by a conventional cable security card, content received through any type of transport protocol (including an IP protocol) including a wired/wireless network can be protected and A-mode resource information can be systematically defined together with other-mode IP communication resource and the resource information of different modes can be integrated and transmitted to the host device.

16 Claims, 9 Drawing Sheets

| Syntax | No. of Bits | Mnemonic |
|---|---|---|
| profile_reply() {<br>    profile_reply_tag<br>    length_field()<br>    for (i = 0; i<N; i++) {<br>    resource_identifier ()<br>    }<br>} | 24 | uimsbf |

FIG. 5

| FDC (SCTE55 Receiver) | RDC (SCTE55 Transmitter) | DOCSIS Cable Modem | Low Speed Communication Resource ID |
|---|---|---|---|
| YES | NO | NO | None |
| YES | NO | YES | None |
| YES | YES | NO | 0x00605043 |
| YES | YES | YES | 0x00608043 |

▨ : This Variation is not permitted

FIG. 6

| FDC (SCTE55 Receiver) | RDC (SCTE55 Transmitter) | DOCSIS Cable Modem | Low Speed Communication Resource ID |
|---|---|---|---|
| YES | NO | NO | None |
| YES | NO | YES | None |
| YES | YES | NO | 0x00605043 |
| YES | YES | YES | 0x00608043 |
| FDC (SCTE55 Receiver) | RDC (SCTE55 Transmitter) | Ethernet NIC | Low Speed Communication Resource ID |
| NO | NO | YES | TBD1 |
| NO | YES | YES | None |
| YES | NO | YES | TBD2 |
| YES | YES | YES | TBD3 |

▨ : This Variation is not permitted

| Ethernet NIC | FDC (SCTE55 Receiver) | . | IP Communication Resource ID |
|---|---|---|---|
| YES | NO | . | TBD4 |
| YES | YES | . | TBD5 |

| FDC (SCTE55 Receiver) | RDC (SCTE55 Transmitter) | DOCSIS Cable Modem | Low Speed Communication Resource ID |
|---|---|---|---|
| YES | NO | NO | None |
| YES | NO | YES | None |
| YES | YES | NO | 0x00605043 |
| YES | YES | YES | 0x00608043 |

: This Variation is not permitted

BROADCASTING RECEIVER AND METHOD OF INTERFACING RESOURCE INFORMATION BETWEEN A HOST DEVICE AND A POD, SENDING HOST DEVICE RESOURCE INFORMATION AND OBTAINING HOST DEVICE RESOURCE INFORMATION

This application claims the benefit of Korean Patent Application No. 10-2007-71711, filed on Jul. 18, 2007, which is hereby incorporated by reference as if fully set forth herein.

BACKGROUND OF THE INVENTION

1. Field of the Invention

The present invention relates to a broadcast receiver, a method for interfacing between a host device and a security card, a method for transmitting host resource information, and a method for acquiring host resource information, and more particularly, to a broadcast receiver, a method for interfacing between a host device and a security card, a method for transmitting host resource information, and a method for acquiring host resource information, wherein broadcast data transmitted based on an Internet protocol is processed.

2. Discussion of the Related Art

Existing television (TV) services have been provided in such a manner that contents produced by broadcasting companies are transmitted through radio transmission media, such as terrestrial waves, cables or satellites, and a viewer watches the transmitted contents through a TV receiver capable of receiving the transmitted contents via the respective transmission media.

However, as digital TV technologies based on digital broadcasting are developed and are commercially available, breaking from existing analog broadcasting, various contents, such as real-time broadcasts, Contents on Demand (CoD), games and news, can be provided to a viewer using the Internet network connected to each home, besides the existing transmission media.

An example of the provision of contents using the Internet network may include an Internet Protocol TV (IPTV). The IPTV indicates a broadcast receiver for receiving various types of information services, moving-image contents and broadcasts using an Internet network and displaying them to a user. The Internet network can be implemented on the basis of various types of networks such as optical cable networks, coaxial cable networks, fiber-to-the-home (FTTH), telephone networks and wireless networks.

The service using the Internet network additionally has bidirectionality and enables a viewer to watch a desired program at his/her convenient time, unlike general terrestrial broadcasting.

SUMMARY OF THE INVENTION

Accordingly, the present invention is directed to a broadcast receiver, a method for interfacing between a host device and a security card, a method for transmitting host resource information, and a method for acquiring host resource information that substantially obviate one or more problems due to limitations and disadvantages of the related art.

An object of the present invention is to provide a broadcast receiver, a method for interfacing between a host device and a security card, a method for transmitting host resource information, and a method for acquiring host resource information, which use an Internet protocol and enable protection of transmitted content through a "conditional access" feature provided by a conventional cable security card.

Another object of the present invention is to provide a broadcast receiver, a method for interfacing between a host device and a security card, a method for transmitting host resource information, and a method for acquiring host resource information, which enable efficient transmission of network capabilities of the host device to the security card in order to process broadcast data received on all types of transport protocols including an IP protocol, over a wired/wireless network.

A further object of the present invention is to provide a broadcast receiver, a method for interfacing between a host device and a security card, a method for transmitting host resource information, and a method for acquiring host resource information, which enable reception of broadcast data from a Multimedia over Coax Alliance (MoCA).

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method of interfacing resource information between a host device and a POD includes sending a resource information requesting message from the POD to the host device, and responding by the host device to the POD with a resource information message including a resource identifier indicating whether the host device supports A-mode resource. Herein the resource identifier is an identifier defined for identifying a Low-Speed Communication resource. And the resource identifier of the Low-Speed Communication resource further indicates whether the host device supports at least one of OOB down mode and OOB up mode.

Also, the resource identifier is an identifier defined for identifying an IP communication resource which is used for supporting A-mode. Herein the resource identifier of the IP communication resource further indicates whether the host device supports OOB down mode.

Also, the host includes an Internet Protocol(IP) physical interface unit for supporting A-mode. Herein the IP physical interface unit receives an Ethernet frame including broadcast data.

In another aspect of the present invention, a method of sending host device resource information includes receiving a resource information requesting message from a POD, identifying whether the host device supports A-mode, inserting a resource identifier indicating whether the host device supports A-mode in a resource information messages when the host device supports A-mode, and sending the resource information message to the POD. Herein the resource identifier is an identifier defined for identifying a Low-Speed Communication resource. And the resource identifier of the Low-Speed Communication resource further indicates whether the host device supports at least of OOB down mode and OOB up mode.

Also, the resource identifier is an identifier defined for identifying an IP communication resource which is used for supporting A-mode. Herein the resource identifier of the IP communication resource further indicates whether the host device supports OOB down mode.

In another aspect of the present invention, a method of obtaining host device resource information includes sending a resource information requesting message to a host device, receiving a resource information message including a resource identifier indicating whether the host device supports A-mode, and obtaining the resource identifier by parsing the received resource information message. Herein the resource identifier is an identifier defined for identifying a Low-Speed Communication resource. And the resource identifier of the Low-Speed Communication resource further indicates whether the host device supports at least of OOB down mode and OOB up mode.

Also, the resource identifier is an identifier defined for identifying an IP communication resource which is used for supporting A-mode. Herein, the resource identifier of the IP communication resource further indicates whether the host device supports OOB down mode.

In another aspect of the present invention, A broadcasting receiver includes POD for sending a resource information requesting message and host device for receiving the resource information requesting message and responding with a resource information message including a resource identifier indicating whether the host device supports A-mode resource. Herein, the resource identifier is an identifier defined for identifying a Low-Speed Communication resource. And the resource identifier of the Low-Speed Communication resource further indicates whether the host device supports at least one of OOB down mode and OOB up mode.

Also, the resource identifier is an identifier defined for an identifying-IP communication resource which is used for supporting A-mode. Herein, the resource identifier of the IP communication resource further indicates whether the host device supports OOB down mode.

According to the present invention, it is possible to protect content using a "conditional access" provided by a conventional cable security card. Thus, service providers can protect their content and stably charge service users using the "conditional access".

In addition, since broadcast data received one all types of transport protocols including an IP protocol over a wired/wireless network is processed so as to enable interfacing with an cable security card, service users can view services of desired providers by minimally changing or extending functions of the conventional cable security card.

Further, information items of network capabilities of the host device for transmitting broadcast data received based on an Ethernet protocol in Internet protocol packets to the security card are systematically defined together with other information items and such information items are then integrated and transmitted to the host device. This enables efficient exchange of information between the host device and the security card.

Furthermore, conventional information transmission systems and methods are supported and extended to enable transmission of additional network information of the host device, so that backward compatibility can be achieved.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 5 illustrates an example resource information table including low-speed communication resource information of a cable broadcast receiver;

FIG. 6 illustrates an example resource information table including extended low-speed communication resource information according to an embodiment of the present invention;

DETAILED DESCRIPTION OF THE INVENTION

Figure 1:
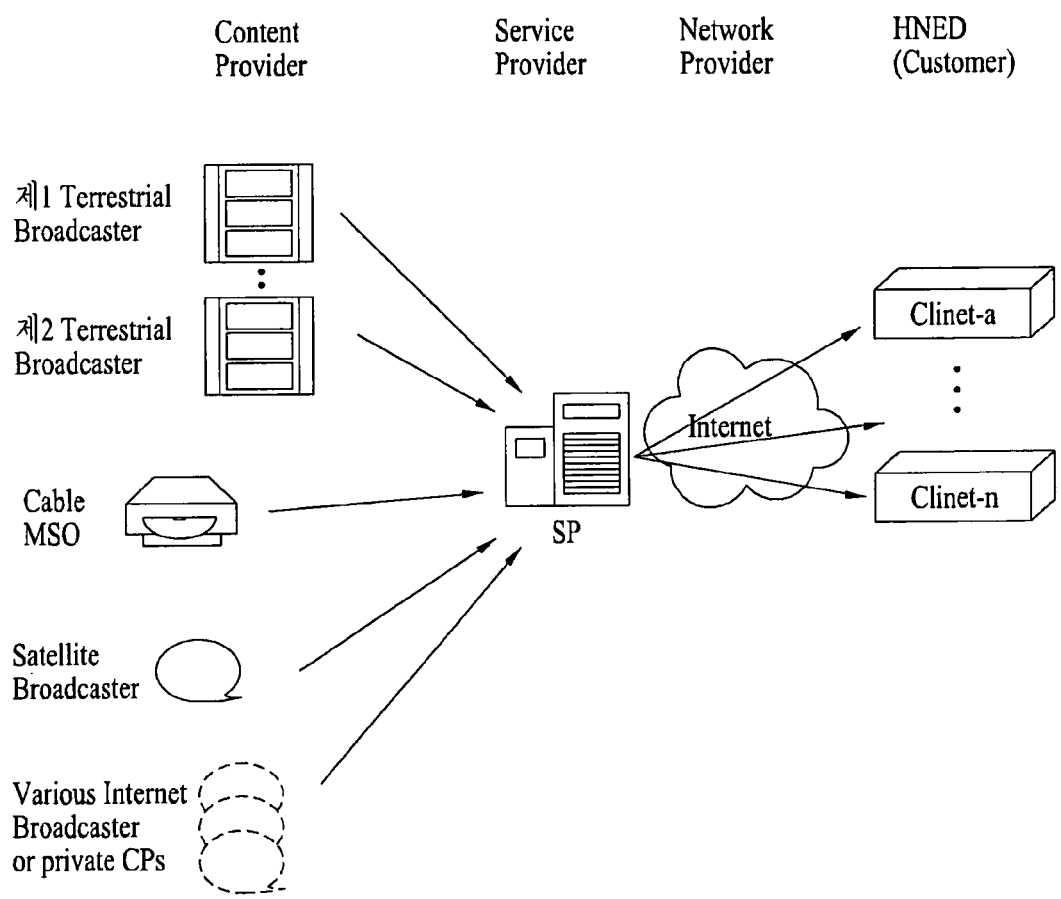
FIG. 1 schematically illustrates an IPTV system according to an embodiment of the present invention.

In addition, although the terms used in the present invention are selected from generally known and used terms, some of the terms mentioned in the description of the present invention have been selected by the applicant at his or her discretion, the detailed meanings of which are described in relevant parts of the description herein. Furthermore, it is required that the present invention is understood, not simply by the actual terms used but by the meanings of each term lying within.

A broadcast receiver and a method of processing broadcast data according to the present invention will be described in detail with reference to the accompanying drawings.

An Internet protocol TV (IPTV) system which is an example of a system capable of providing various types of contents using an Internet network may be largely divided into a server, a network and a broadcast receiver (client).

The server of the IPTV system may include servers having various functions, such as a service discovery and selection server, a streaming server, a content guide information server, a customer information server, and a payment information server.

Among these servers, the streaming server transmits stored Moving Picture Experts Group (MPEG)-2 or MPEG-4 encoding moving-image data to the broadcast receiver via a network. As a transmission protocol, a real-time transport protocol (RTP) or a RTP control protocol (RTCP) may be used.

In the case where a real-time streaming protocol (RTSP) is used, the reproduction of a moving-image stream can be controlled by a network trick play function such as Pause, Replay, Stop or the like to some extent.

The content guide information server provides information on provided various contents. The content guide information includes a variety of information on the contents as information corresponding to electronic program guide (EPG) information. The content guide information server stores content guide information data and provides the stored data to the broadcast receiver.

Among the servers, the service discovery and selection server provides access information of servers for providing various types of content services such as broadcasts, Contents on Demand (CoD) or games and reproduction information to the broadcast receiver.

A network system includes an Internet-based network and gateways. As the Internet-based network, various types of networks based on the IP, such as optical cable networks, coaxial cable networks, fiber-to-the-home (FTTH), telephone networks and wireless networks, may be used. The gateways may generally perform data delivery, multicast group management using a protocol such as an Internet Group Management Protocol (IGMP) and Quality of Service (QoS) management.

The IPTV indicates a broadcast receiver capable of receiving data transmitted via the Internet network and providing the data to a user. The broadcast receiver may include an IPTV settop, a homenet gateway and an IPTV embedded TV.

A hybrid IPTV system can provide various types of contents of the Internet as well as various types of existing broadcast contents. That is, besides various types of broadcast contents such as terrestrial broadcasting, cable broadcasting, satellite broadcasting or private broadcasting, various Internet image contents or data contents other than images can be provided to the user. These contents may be provided in real time or on demand.

FIG. 1 is a schematic view showing an IPTV system according to an embodiment of the present invention.

From the viewpoint of a content service provider, the IPTV system may be divided into a content provider (CP), a service provider (SP), a network provider (NP) and a user.

The CP manufactures and provides various types of contents. The CP may include a terrestrial broadcaster, a cable system operator (SO) or a cable multiple system operator (MSO), a satellite broadcaster and an Internet broadcaster.

The SP packages contents provided by the CP to a service and provides the service. For example, the SP of FIG. 1 packages a first terrestrial broadcast, a second terrestrial broadcast, a cable MSO broadcast, a satellite broadcast, various Internet broadcasts to the service and provides the service to the user.

As means for protecting the contents transmitted in the IPTV system, conditional access or content protection may be used. As an example of the conditional access or the content protection, a cable card or a downloadable conditional access system (DCAS) may be used.

The use of the security card or the DCAS is selected by the SP for providing the IPTV service. In the case where the security card or the DCAS is used in the broadcast receiver, the SP communicating with the broadcast receiver should use that system.

Figure 2:
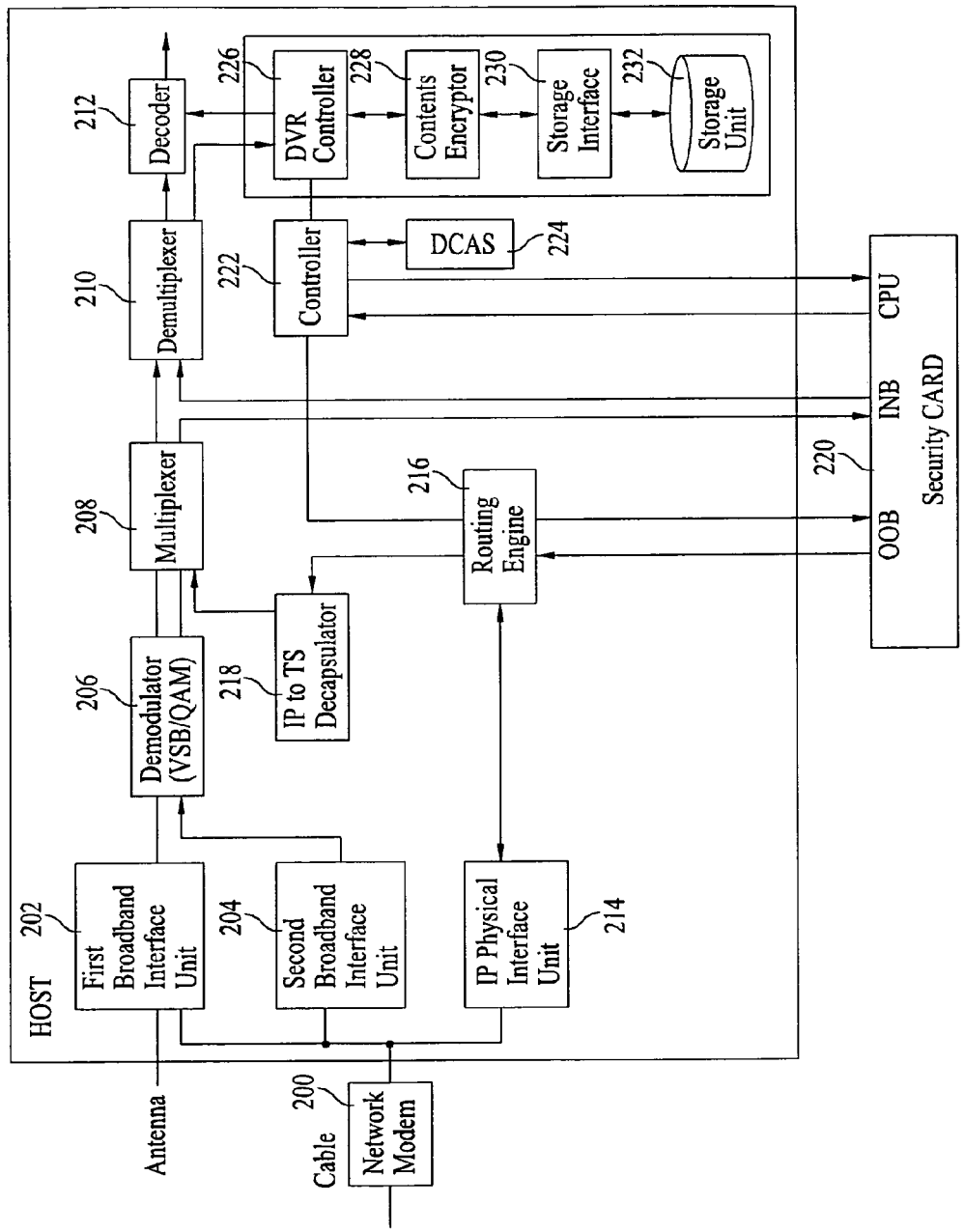
FIG. 2 schematically illustrates a receiver that uses a security card according to an embodiment of the present invention.

FIG. 2 is a schematic block diagram showing a broadcast receiver using the security card according to an embodiment of the present invention.

The broadcast receiver of FIG. 2 can receive all of an IPTV service based on the IP, a cable broadcast, a terrestrial broadcast and a satellite broadcast. The broadcast receiver of FIG. 2 may receive only the IPTV service or cable broadcasting according to the implementation examples. The security card of FIG. 2 may be called other terms according to the implementation examples.

The broadcast receiver of FIG. 2 is largely divided into a host device and a security card. The host device includes a first broadband interface unit 202, a second broadband interface unit 204, a demodulator 206, a multiplexer 208, a demultiplexer 210, a decoder 212, an IP physical interface unit 214, a routing engine 216, an IP to transport packet (TP) decapsulator 218, a controller 222, a downloadable CAS (DCAS) 224, a digital video recorder (DVR) controller 226, a content encryptor 228, a storage interface 230, and a storage unit 232. The security card 220 may be a single stream card capable of processing only one stream and a multi stream card capable of simultaneously processing a plurality of streams. For example, the security card 220 may be implemented by a cable card or a smart card.

The broadcast receiver is an open cable type receiver in which the security card including a conditional access system (CAS) can be detached from a main body. The security card is also called a point of deployment (POD) module, which is inserted into or detached from a slot of the main body of the broadcast receiver. The main body into which the security card is inserted is also called a host device. That is, a combination of the security card and the host device is called the broadcast receiver.

The host device included in the broadcast receiver of FIG. 2 is one example implemented by a multi stream host device capable of simultaneously processing a plurality of streams. When a host device is implemented by a single stream host device capable of processing only one stream, it is bypassed for multiplexer 208 and the demultiplexer 210 of the host device of FIG. 2 to generate a CableCard MPEG Packet (CMP) by appending a Packet Header to a MPEG transport packet and multiplex the CMP and demultiplex the multiplexed CMP. But, though a host device is implemented a single stream host device, the other operations that the present invention disclose are performed identically.

The Implementation Examples

A network modem 200 connects an external network and the broadcast receiver. For example, the broadcast receiver may be connected to the external network using a data over cable service interface specification (DOCSIS) modem, a wireless repeater connected to a wireless Internet network, or a wired repeater connected to a wired Internet network, such as a wired Asymmetric Digital Subscriber Line (ADSL) repeater. The example of the connection between the broadcast receiver and the external network is only exemplary and may vary depending on how the broadcast receiver is connected to the external network.

Figures 3, 4:
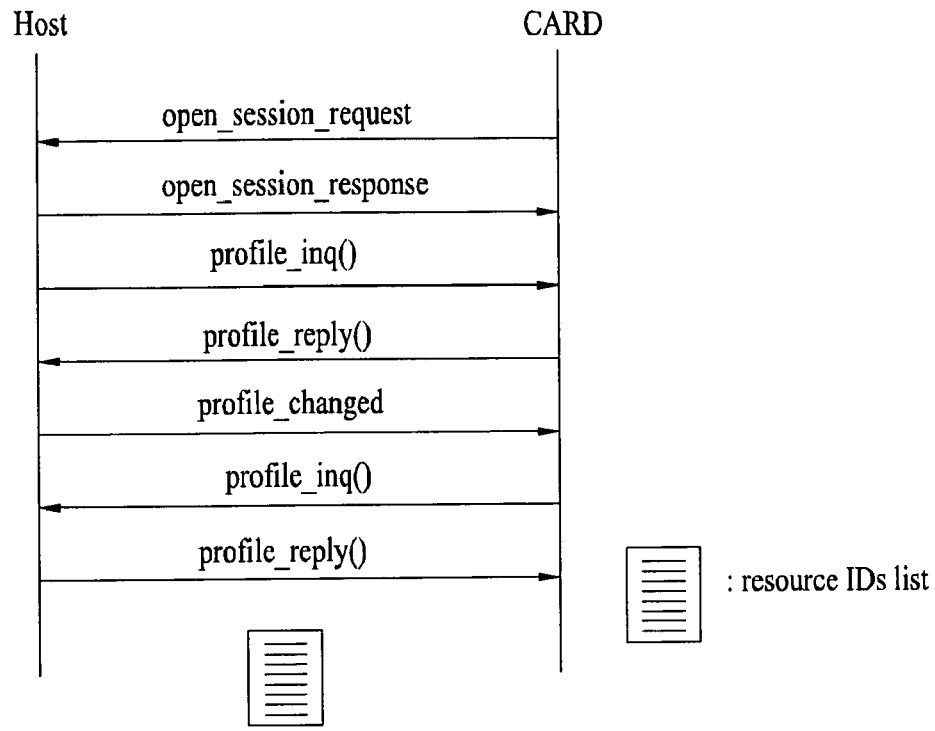
FIG. 3 illustrates a procedure for operating an RM protocol according to an embodiment of the present invention.
FIG. 4 illustrates a syntax of profile_reply( )APDU according to an embodiment of the present invention.

FIG. 3 is a view showing the connection between the broadcast receiver and the external network using the DOCSIS modem according to the present invention.

In the case where the network modem 200 is implemented by the DOCSIS modem, the broadcast receiver according to the present invention may be connected to a DOCSIS network. That is, the network modem 200 may build a cable modem termination system (CMTS) (DSG agent) and a DSG tunnel for delivering a data broadcast received from a set-top controller (DSG server) via the DOCSIS network and receive broadcast data via the built DSG tunnel. Here, the DOCSIS network may be implemented by an IP backbone network and support IP multicast/unicast.

However, in order to support the IP multicast/unicast via the DOCSIS network, a packet received from the CMTS (DSG agent) should be transformed to a DSG packet and the DSC packet should be transmitted. Accordingly, the broadcast receiver cannot be directly connected to the external IP network so as to receive the broadcast data.

In order to solve these problems, the network modem 200 may provide a function for directly connecting the broadcast receiver to the external IP network. For example, the network modem 200 may be implemented by a Multimedia over Coax Alliance (MoCA). In the case where the network modem 200 is implemented by the MoCA, the IP-based network may be established and connected over a coaxial cable network. That is, in the case where the network modem 200 is implemented by the MoCA, the DOCSIS may not be used, the DOCSIS modem does not need to be used, and the CMTS connected to the DOCSIS modem over the network does not need to be used. In addition, the DSG tunnel established between the DOCSIS modem and the CMTS does not need to be used. Accordingly, since seamless IP-based connectivity may be implemented over the coaxial network, the broadcast receiver according to the present invention can use IP over Coax and thus provide a rapid stable broadcast service to the user.

The first broadband interface unit 202 tunes to only a specific channel frequency of terrestrial audio/video (A/V) broadcasting transmitted via an antenna or cable A/V broadcasting transmitted in-band via a cable connected to the network modem 200, and outputs the tuned signal to the demodulator 206.

At this time, since the terrestrial broadcast and the cable broadcast are transmitted by different transmission methods, they are demodulated by different demodulation methods in the demodulator 206. For example, while the terrestrial A/V broadcast is modulated by a vestigial sideband modulation (VSB) method, the cable A/V broadcast is modulated by a quadrature amplitude modulation (QAM) method. Therefore, if the channel frequency tuned by the first broadband interface unit 202 is the terrestrial broadcast, the demodulator 206 demodulates the terrestrial broadcast by the VSB method and if the channel frequency tuned by the first broadband interface unit 202 is the cable broadcast, demodulates the cable broadcast by the QAM method.

The second broadband interface unit 204 tunes to only a specific channel frequency of cable A/V broadcast transmitted in-band via the cable connected to the network modem 200, and outputs the tuned signal to the demodulator 206.

The first broadband interface unit 202 and the second broadband interface unit 204 may tune the signals of different channels and transmit the signals to the demodulator 206. Alternatively, the first broadband interface unit 202 and the second broadband interface unit 204 may tune different A/V streams of the same channel and transmit the signals to the demodulator 206. For example, the first broadband interface unit 202 may tune a stream of a main picture and the second broadband interface unit 204 may tune a stream of a picture in picture (PIP). In the case where a digital video signal is stored in a digital video recorder (DVR), the video signal may be watched and recorded using the first broadband interface unit 202 and the second broadband interface unit 204.

The demodulator 206 demodulates the received signal and transmits the demodulated signal to the multiplexer 208. The multiplexer 208 may multiplex the signals output from the demodulator 206 and the IP to TP decapsulator 218 and output the multiplexed signal. For example, the main video signal which is tuned by the first broadband interface unit 202 and is demodulated and the PIP video signal which is tuned by the second broadband interface unit 204 and is demodulated are multiplexed and the multiplexed signal is output. The video signals of different channels may be multiplexed, or the demodulated signal and the signal output from the IP to TP decapsulator 218 may be multiplexed, according to the implementation examples.

If the signal output from the multiplexer 208 is terrestrial broadcast data, the signal is output to the demultiplexer 210 and, if the signal output from the demultiplexer 208 is the cable broadcast data or the IPTV broadcast data, the signal is output to the demultiplexer 210 via the security card 220 mounted in the slot. The security card 220 includes the CAS in order to prevent higher value-added broadcasting contents from being copied and permit conditional access, which is also called the POS module.

That is, if the received broadcast data is scrambled, the security card 220 descrambles the broadcast data and outputs the descrambled data to the demultiplexer 210. If the security card 220 is not mounted, the A/V broadcast data output from the multiplexer 208 is directly output to the demultiplexer 210. In this case, the scrambled A/V broadcast data cannot be descrambled and thus cannot be normally watched.

The demultiplexer 210 routes the A/V broadcast data output from the multiplexer 208 and the A/V broadcast data output from the security card 220 to be output to the decoder 212 or the DVR controller 226. The decoder 212 restores the compressed A/V signal to an original signal via a video/audio decoding algorithm and outputs the restored signal.

The DVR controller 226, the content encryptor 228, the storage interface 230 and the storage unit 232 serve to store the received digital data or reproduce the stored data. The DVR controller 226 controls MPEG TS routed by the demultiplexer 210 to be stored or controls video data, audio data and system data selected from stored data to be reproduced, under the control of the controller 222. The content encryptor 228 encrypts data to be stored and outputs the encrypted data or decrypts the encrypted data and outputs the decrypted data. The encryptor 228 may not be used according to the implementation examples.

The storage interface 230 performs data input/output interface with the storage unit 232, and the storage unit 232 stores the received data.

The DCAS 224 may download and store the CASs from a transmission server and perform a CAS function according to a proper CAS of the stored CASs. The controller 222 controls data processing of the host device and the interface between the host device and the security card.

The Ethernet NIC 214 receives an Ethernet frame packet destined for a specific IP address in a signal received through the network modem 200, and transmits the received Ethernet frame packet to the routing engine 216. The Ethernet NIC 214 may also receive data for two-way communication (for example, a paid program request, receiver status information, user input, etc.) from the routing engine 216 and then transmit the received data to an external network through the network modem 200. The specific IP address may be an IP address of the host device or an IP address of the security card. Here, the method in which the Ethernet NIC 214 receives an Ethernet frame through the network modem 200 and transmits the received Ethernet frame to the routing engine 216 and the routing engine 216 then routes the received packet to a destination of the packet using a TCP/IP network stack will now be referred to as an "IP mode". The Ethernet NIC 214 and the routing engine 216 correspond to IP-mode resources that support the IP mode.

In the broadcast receiver of FIG. 2, IPTV broadcast data according to the IP protocol, a Video On Demand (VOD) signal or an Out Of Band (OOB) message signal may be received via the IP physical interface unit 214. In the existing cable broadcast, an OOB message such as System Information (SI), an Emergency Alert System (EAS), an extended Application Information Table (XAIT), CAS information, or a variety of card control information is received using a DOCSIS Settop gateway (DSG) method or an OOB method.

In the broadcast receiver of FIG. 2, the DOCSIS modem or the OOB tuner may be included in the host device such that the OOB message is received. For example, the OOB message may be received using one of the IP method and the OOB method or using one of the IP method, the DSG method and the OOB method.

In the case where the OOB message is received using one of the IP method and the OOB method, the broadcast receiver of FIG. 2 further requires an OOB tuner or demodulator. In the case where the OOB message is received using one of the IP method, the DSG method and the OOB method, the broadcast receiver of FIG. 2 further requires the DOCSIS modem, the OOB tuner, a switching unit for selecting one of the DSG method and the OOB method, and a demodulator for transmitting the data to the headend according to the method.

In the case where all the IP method, the DSG method and the OOB method can be used or in the case where both the IP method and the OOB method can be used except for the DSG method, the transmitter selects one of the above-described methods and transmits information on the selected method to the security card 220. The security card 220 informs the host device of the operating method according to the information on the method selected by the transmitter. In this case, backward compatibility can be solved.

In the broadcast receiver of FIG. 2, for convenience of description, the case where the OOB message is received via the IP physical interface unit 214 using the IP, instead of the DSG method using the DOCSIS modem or the OOB method using the OOB tuner, will be described. In this case, the transmitter should packetize the OOB message using the IP and transmit the OOB message. In the VOD or IPTV broadcast, the message such as the CAS information may be received in the form of a packet such as a VOD packet or an IPTV broadcast packet.

The OOB message is only exemplary, and other necessary information may be added or unnecessary information of the above-described information may be excluded according to the implementation examples.

The routing engine 216 routes the received packet to a destination of the packet using a TCP/IP protocol-based network stack. The TCP/IP network 216 supports both a TCP/IP protocol and a user datagram protocol (UDP)/IP protocol.

The routing engine 216 routes the received VOD signal or the IPTV broadcast data to the IP to TP decapsulator 218. The IP to TP decapsulator 218 parses the received MPEG or MPEG-2 TS packet and outputs the parsed packet to the multiplexer 208. The process after the multiplexer 208 is described above. Since the MPEG-2 broadcast data is used in the above example, the TP packet is received and parsed. However, in the case where the broadcast data using other standard is received, other units may be used instead of the TP packet unit. Accordingly, the scope of the present invention is not limited to the terms used in the implementation examples.

The routing engine 216 transmits the packet, of which the destination is the security card 220, to the security card 220. The OOB message which is one of the packets of which the destination is the security card 220 is routed by the routing engine 216 and transmitted to the security card 220. In the case where the OOB message is routed to the security card 220, the data can be transmitted to the security card 220 using a second layer routing method, a third layer routing method, or a fourth layer routing method.

If the second layer routing method is used, the message is routed using a media access control (MAC) address system of the destination included in the header of the received Ethernet frame. If the third layer routing method is used, the message is routed using an IP address system of the destination included in the IP header of the received Ethernet frame. The use of the second layer routing method or the third layer routing method may vary according to implementation examples. If the fourth layer routing method is used, the message is routed using a port number included in the UDP header of the received Ethernet frame. If the received Ethernet frame includes the TCP header, the message is routed using a port number included in the TCP header of the received Ethernet frame. The use of the second layer routing method, the third layer routing method or the fourth layer routing method may vary according to implementation examples. That is, the second layer routing method, the third layer routing method or the fourth layer routing method may be used according to implementation examples.

A data channel, an extended channel and an in-band channel exist between the security card and the host device. The data channel is set such that a control signal is exchanged between the host device and the security card, and the extended channel is set such that actual data is exchanged. The data channel and the extended channel are CPU interfaces which are defined such that data is exchanged between the host device and the security card.

That is, the security card communicates with a transmitter, analyzes a command received from the transmitter, and performs an operation instructed by the transmitter while communicating with the host device via the data channel and the extended channel or sends contents input by the user to the transmitter.

At this time, in order to transmit the data via the extended channel, first, a transmission line corresponding to the data type defined between the security card and the host device should be set. This is called a flow. For example, in order to transmit MPEG section data, an MPEG section flow is set between the security card and the host device and then the MPEG section data is actually transmitted via the flow. The extended channel may include a DSG flow, an IP flow and an MPEG section flow. Only, if eCM(embeded Cable Modem) like DOCSIS Modem is not used in the host device, the DSG flow is not used in the flows. Herein the IP flow may include at least one of an IP unicast (IP_U) flow and an IP multicast (IP_M) flow.

The in-band channel is set between the host device and the security card in order to transmit an MPEG-2 transport packet containing audio, video and data and corresponds to an MPEG interface or an in-band MPEG-TS interface. The MPEG data flow is set as the transmission line for transmitting the data via the in-band channel.

Before the communication operating mode of the host device as described above is set or before the host device exchanges an OOB message or the like with the security card, the host device needs to provide the security card with information of network operating modes supported by the host device. Accordingly, while the interface between the host device and the security card is initialized, for example when the host device boots or when the security card is inserted into the host device, the host device transmits the information of network operating modes supported by the host device to the security card.

FIG. 3 illustrates a procedure for operating a Resource Manager (RM) protocol according to an embodiment of the present invention.

Using the RM protocol, a list of identifiers (IDs) of all resources of the host device can be transferred to the security card. Using the RM protocol, the security card can acquire resource information of the host device such as Conditional Access System (CAS) information and information of network operating modes supported by the host device. Control of the host device and the security card and data transmission and reception between the host device and security card is performed based on the acquired resource information.

Transmission and reception of resource information according to the RM protocol is performed as an application stack starts in a process for initializing the interface between the host device and the security card.

First, the security card requests that the host device open a session according to the RM protocol (open_session_request). Upon receiving the session open request from the security card, the host device sends a respond(open_session_response) with respect to the request to the security card by opening a session.

When the session is opened, the host device transmits a profile_inq( ) Application Data Unit (APDU), requesting information of supportable resources, to the security card. In response to this request, the security card transmits a profile_reply( ) APDU to the host device. The profile_reply( ) APDU transmitted to the host device includes information of all resources supportable by the security card.

The host device transmits a profile_changed( ) APDU, including information of changed resources, to the security card in response to the profile_reply( ) information received from the security card. The host device transmits the profile_changed( ) APDU when a change has been made to resources of the host device.

The security card transmits a profile_inq( ) APDU, requesting information of supportable resources of the host device, back to the host device. The host device transmits a profile_reply( ) APDU to the security card in response to this request. The profile_reply( ) APDU transmitted to the security card includes information of all resources supportable by the host device. Thus, by receiving the profile_reply( ) APDU transmitted from the host device, the security card can acquire the information of all resources supportable by the host device.

Herein, the profile_inq( ) APDU can be considered an example of a resource information request message and the profile_reply( ) APDU can be considered an example of a resource information message. That is, the profile_reply( ) APDU includes respective resource identifiers of all resources supportable by the host device. The resources supportable by the host device include a low-speed communication resource and an IP communication resource.

The low-speed communication resource basically indicates a resource that supports an OOB down mode, an OOB up mode, or a Docsis mode of the conventional cable card. Here, the OOB down mode is a network operating mode based on a Forward Data Channel (FDC), the OOB up mode is a network operating mode based on a Reverse Data Channel (RDC), and the DOCSIS mode is a network operating mode based on a DOCSIS cable modem.

The low-speed communication resource can be extended to a resource that also supports the A-mode. Here, the A-mode is a network operating mode based on the Ethernet NIC 214. An example of the A-mode is the IP mode as shown in FIG. 2.

The IP communication resource is a resource that supports the A-mode. That is, the IP communication resource independently (or separately) indicates that the host device supports the A-mode, instead of the extending the low-speed communication resource to indicate that the host device supports the A-mode.

FIG. 4 illustrates a syntax for the profile_reply( ) APDU according to an embodiment of the present invention.

A profile_reply_tag field is a 24-bit field and has a value indicating that the APDU is a profile_reply( ) APDU. Length_field( ) includes information of the size of a subsequent field in units of bytes. A 'for' loop is repeated the same number of times as the number of resource information items and a resource_identifier( ) in the 'for' loop includes identification information of a corresponding resource. Here, the identification information of the corresponding resource may be a resource identifier defined in a resource information table.

FIG. 5 illustrates an example resource information table that includes information of low-speed communication resources of a cable broadcast receiver.

Specifically, FIG. 5 illustrates resource IDs according to network operating modes used in the host device of the cable broadcast receiver. In FIG. 5, a Forward Data Channel (FDC) is a downstream OOB channel and a Reverse Data Channel (RDC) is an upstream OOB channel. That is, the host device supports an OOB-mode downstream network when an FDC is present and supports an OOB-mode upstream network when an RDC is present.

In the case of FIG. 5, the host device basically supports an OOB-mode downstream network (i.e., FDC). The host device supports an OOB-mode downstream network alone if identification information of a low-speed communication resource is not included in the resource_identifier( ). Since the host device is not permitted to support only both the OOB-mode downstream network and the DOCSIS modem network, when identification information of a low-speed communication resource is not included in the resource_identifier( ), the host device supports only the OOB-mode downstream network.

The identification information of the low-speed communication resource has a value of "0x00605043" when the host device supports both the OOB-mode downstream network (FDC) and the OOB-mode upstream network (RDC) and does not support the DOCSIS modem network. The identification information of the low-speed communication resource has a value of "0x00608043" when the host device supports both the OOB-mode downstream network and the OOB-mode upstream network and also supports the DOCSIS modem network.

However, when the A-mode is supported, i.e., when the IP mode is supported as in FIG. 2, it is necessary to be able to transmit information as to whether or not the IP mode is supported. A method of extending the low-speed communication resource and a method of using a new resource can be considered in order to transmit information as to whether or not the IP mode is supported.

The information of the network operating mode may be transmitted using a newly defined resource instead of using the existing resource. However, the following description is given of the method of extending the low-speed communication resource and the method of using a new resource with reference to the conventional table as shown in FIG. 5 without change in order to enable backward compatibility.

FIG. 6 illustrates an example resource information table including extended low-speed communication resource information according to an embodiment of the present invention. An upper part of the table of FIG. 6 includes the same information as that of FIG. 5 and a lower part is an extended portion.

Although the host device can use all of the IP, OOB, and DSG modes among a variety of network operating modes, the example of FIG. 6 illustrates only the case where the host device supports only the IP and OOB modes for ease of explanation. In the case where all the IP, OOB, and DSG modes are employed, possible cases according to whether or not the DOCSIS modem network is supported are added to the lower part of the table of FIG. 6.

The case of the extended part of FIG. 6 basically supports the IP mode. When the identification value of the low-speed communication resource is "To Be Determined (TBD)1", only the Ethernet Network Interface Card (NIC) for supporting the IP mode is provided whereas the OOB-mode downstream (FDC) and OOB-mode upstream (RDC) networks are not supported. When the OOB-mode downstream is not supported, the OOB-mode upstream is not necessary. Therefore, the case where only both the OOB-mode upstream network and the Ethernet NIC are supported is not permitted.

When the identification value of the low-speed communication resource is "TBD2", the Ethernet NIC for supporting the IP mode and the OOB-mode downstream network are supported. When the identification value of the low-speed communication resource is "TBD3", the Ethernet NIC, the OOB-mode downstream network, and the OOB-mode upstream network are supported.

Figure 7:
FIG. 7 illustrates an example resource information table including low-speed communication resource information and IP communication resource information according to an embodiment of the present invention.

FIG. 7 illustrates an example resource information table including low-speed communication resource information and IP communication resource information according to an embodiment of the present invention. An upper part of the table of FIG. 7 includes newly defined IP communication resource information and a lower part includes low-speed communication resource information. The IP communication resource information includes identification information indicating whether or not the host device supports the IP mode and the identification information is transmitted by being included in the resource_identifier( ) of FIG. 4. The IP communication resource information may include only the identification information indicating whether or not the host device supports the IP mode and may also include not only information indicating whether or not the host device supports the IP mode but also information indicating whether or not the host device supports a mode other than the IP mode. The term "IP communication resource" is only an example that does not limit the spirit of the invention.

The example of FIG. 7 is implemented when only the IP and OOB mode networks are used. Other possible cases are added when the DSG mode is further used.

When the identification value of the IP communication resource is "TBD4" in the example of FIG. 7, the IP-mode Ethernet NIC is supported while the OOB-mode downstream (FDC) network is not supported. When the identification value of the IP communication resource is "TBD5", the Ethernet NIC and the OOB-mode downstream network are supported. When the identification value of the IP communication resource is not provided, the IP mode is not supported and network operating mode information can be acquired (or determined) according to the low-speed communication resource.

In the above example, it is assumed that the OOB-mode downstream network is basically supported in the low-speed communication resource. Accordingly, when no low-speed communication resource is provided, the security card determines that the OOB-mode downstream network is supported. Therefore, in this embodiment, whether or not the OOB-mode downstream network is supported is determined from the IP communication resource to identify the case where only the Ethernet NIC is supported as shown in FIG. 7. That is, the example of FIG. 7 includes not only information as to whether or not the IP mode is supported but also information as to whether or not the OOB mode is supported.

Using the IP communication resource and the low-speed communication resource described above, the security card 220 can determine whether or not the IP mode, the OOB-mode downstream network, and the OOB-mode upstream network are supported.

For example, when the host device supports only the IP mode, "TBD4" is included as an IP communication resource identification value in the resource_identifier( ) of FIG. 4 and no low-speed communication resource identification value is included. When the host device supports both the IP mode and the OOB-mode downstream network, "TBD5" is included as an IP communication resource identification value in the resource_identifier( ) and no low-speed communication resource identification value is included.

When the host device supports the IP mode, the OOB-mode downstream network, and the OOB-mode upstream network, two examples can be considered. That is, an information identification value of "TBD4" and a low-speed communication resource identification value of "0x00605043" are transmitted to the security card. Alternatively, an information identification value of "TBD5" and a low-speed communication resource identification value of "0x00605043" are transmitted to the security card. These two examples can be selectively used depending on implementations. The above examples are provided according to an embodiment of the present invention and network operating mode information of the host device may also be transmitted to the security card 220 according to a preset rule such as a rule that higher priority is given to the IP communication resource than to the low-speed communication resource.

Figure 8A:
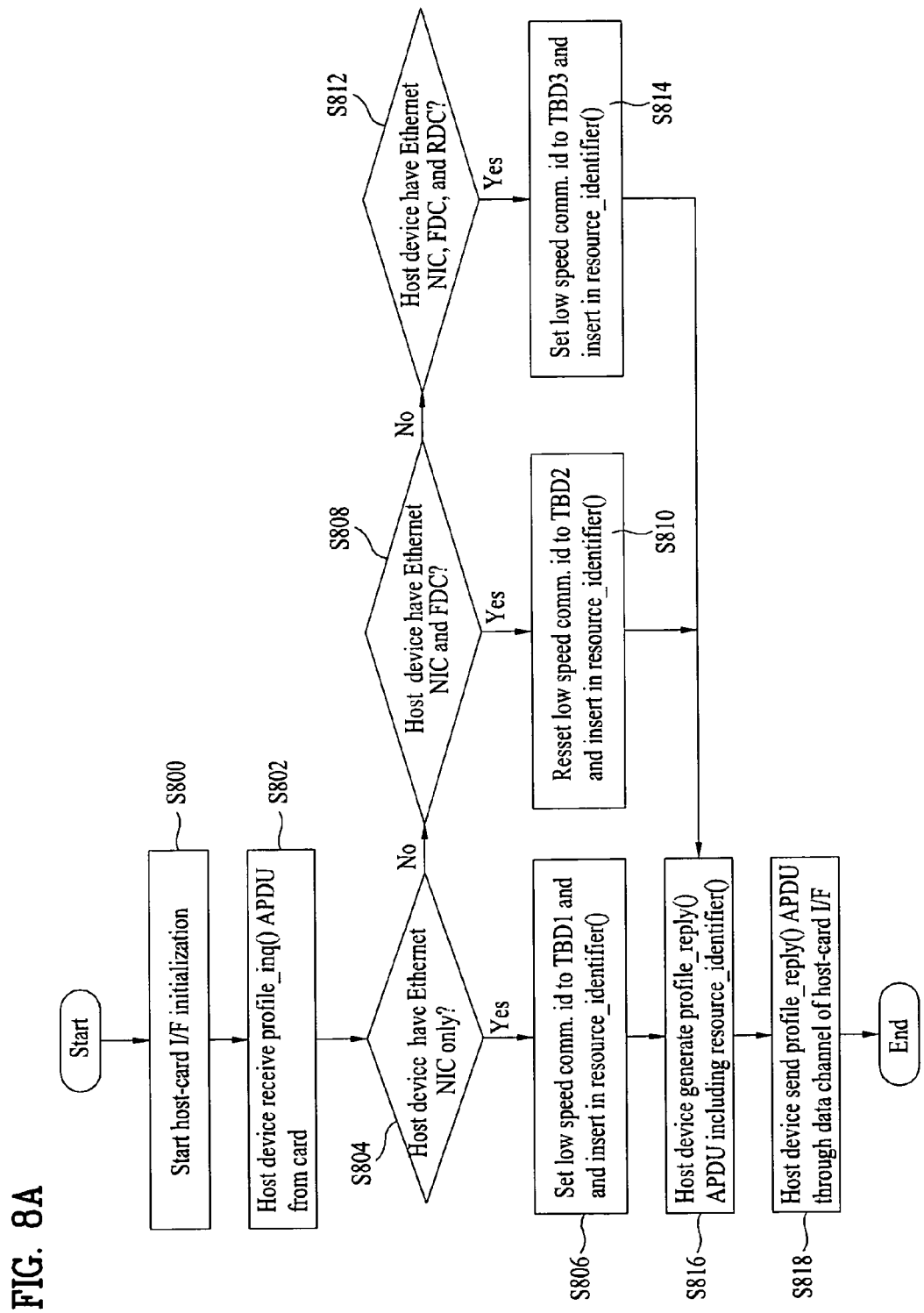
FIG. 8A and FIG. 8B are flow charts illustrating procedures for transmitting and receiving network operating mode information of a host device according to an embodiment of the present invention.
Figure 8B:
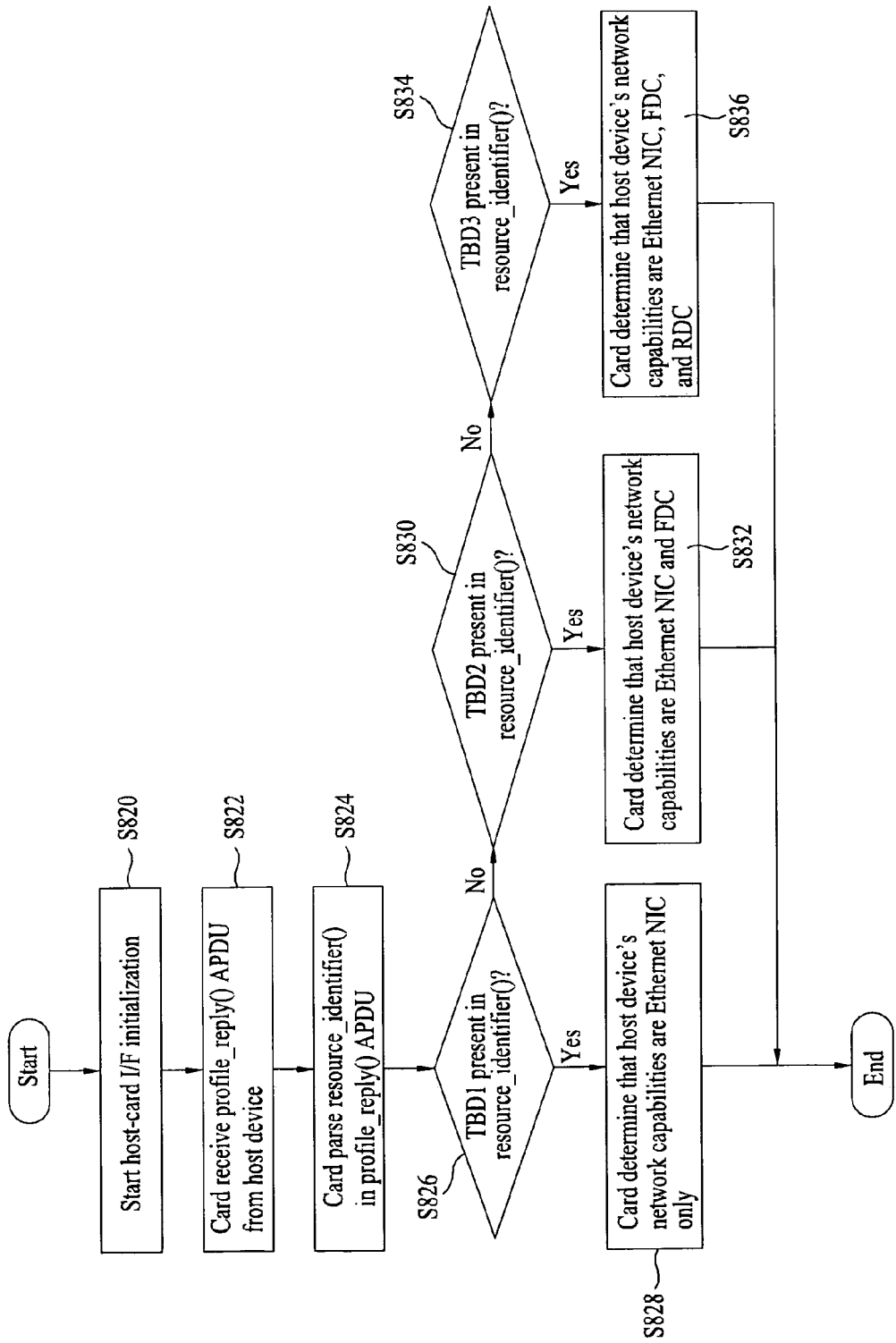

FIGS. 8A and 8B are flow charts illustrating procedures for transmitting and receiving network operating mode information of a host device according to an embodiment of the present invention. Specifically, FIG. 8A illustrates a procedure for transmitting network operating mode information of the host device using the extended low-speed communication resource as shown in FIG. 6.

First, an interface (I/F) between the host device and the security card is initialized (S800). The interface between the host device and the security card may be initialized when the host device boots or when the security card is inserted into the host device.

While the interface between the host device and the security card is initialized, resource information is transmitted and received according to a Resource Manager (RM) protocol. Here, the host device receives a host resource information request (profile_inq( ) APDU) from the security card (S802).

Upon receiving the request from the security card, the host device determines supportable network operating modes. When the host device supports only the Ethernet NIC (S804), the host device sets the low-speed communication resource identification information to "TBD1" (S806). When the host device supports the Ethernet NIC and the OOB-mode downstream (FDC) (S808), the host device sets the low-speed communication resource identification information to "TBD2" (S810). When the host device supports the Ethernet NIC, the OOB-mode downstream (FDC), and the OOB-mode upstream (RDC) (S812), the host device sets the low-speed communication resource identification information to "TBD3" (S814).

A list of these resource identification values is set in the resource_identifier( ). The host device generates a profile_reply( ) APDU including the resource_identifier( ) (S816) and transmits the profile_reply( ) APDU to the security card through a data channel (S818).

FIG. 8B illustrates a procedure for receiving network operating mode information using the extended low-speed communication resource as shown in FIG. 6.

First, an interface (I/F) between the host device and the security card is initialized as described above (S820). The interface between the host device and the security card may be initialized when the host device boots or when the security card is inserted into the host device.

While the interface between the host device and the security card is initialized, resource information is transmitted and received according to a Resource Manager (RM) protocol.

Here, the security card receives host resource information (profile_reply( ) APDU) from the host device (S822).

The security card parses the received profile_reply( ) APDU to acquire resource information included in the profile_reply( ) APDU (S824). The resource information may be included in a resource_identifier( ) in the profile_reply( ) APDU. When a low-speed communication resource included in the profile_reply( ) APDU has a value of "TBD1" (S826), the security card determines that the host device supports only the Ethernet NIC (S828).

When the low-speed communication resource included in the profile_reply( ) APDU has a value of "TBD2" (S830), the security card determines that the host device supports the Ethernet NIC and the OOB-mode downstream (FDC) (S832). When the low-speed communication resource has a value of "TBD3" (S834), the security card determines that the host device supports the Ethernet NIC, the OOB-mode downstream (FDC), and the OOB-mode upstream (RDC) (S836). In the above case, network operating mode information is transmitted and received using conventional low-speed communication resources.

Figure 9A:
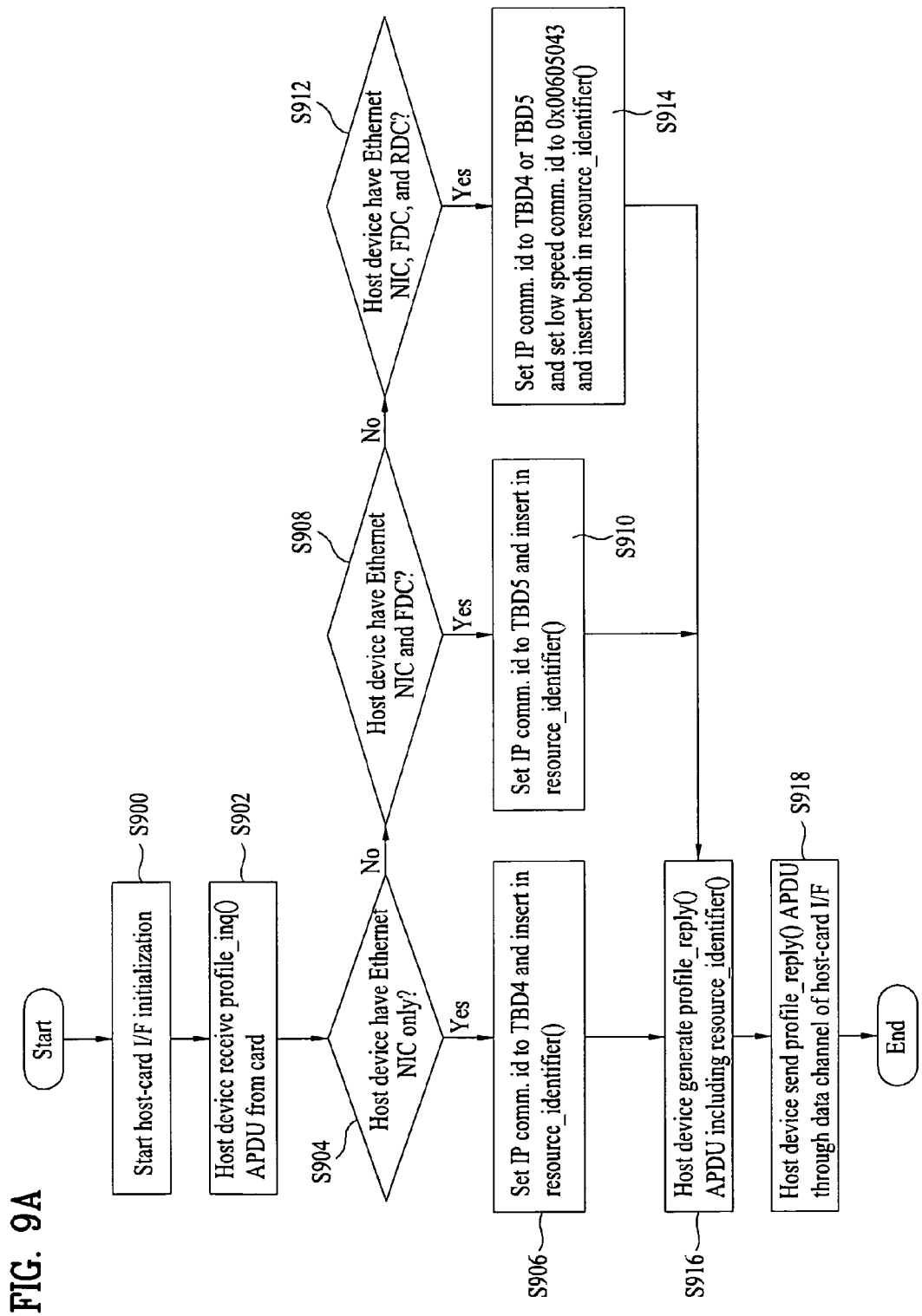
FIGS. 9A and 9B are flow charts illustrating procedures for transmitting and receiving network operating mode information of a host device according to another embodiment of the present invention.
Figure 9B:
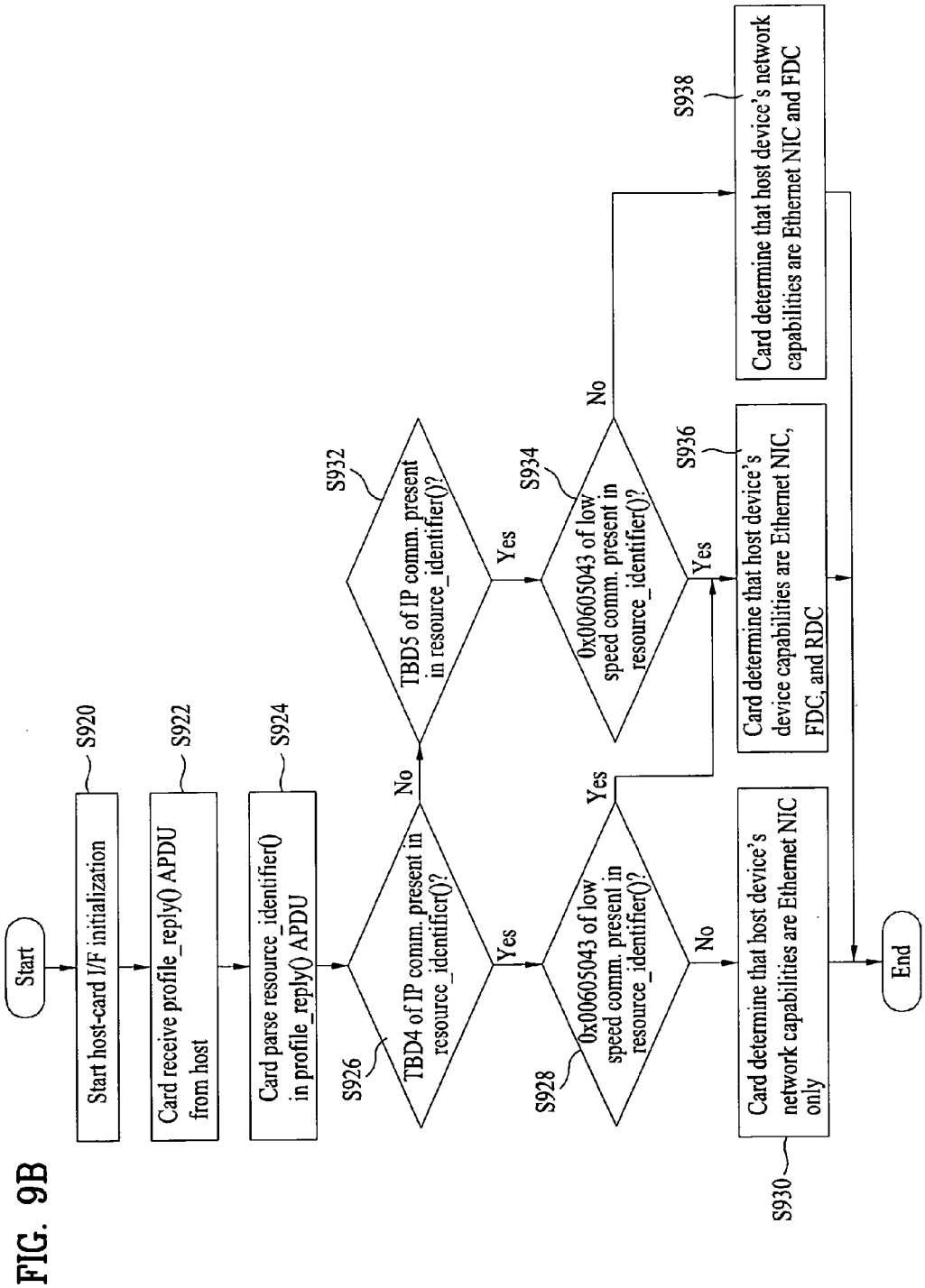

FIG. 9A and FIG. 9B are flow charts illustrating procedures for transmitting and receiving network operating mode information of a host device according to another embodiment of the present invention. Specifically, FIG. 9A illustrates a procedure for transmitting network operating mode information of the host device using the newly defined resource as shown in FIG. 7.

First, an interface (I/F) between the host device and the security card is initialized (S900). The interface between the host device and the security card may be initialized when the host device boots or when the security card is inserted into the host device as described above.

While the interface between the host device and the security card is initialized, resource information is transmitted and received according to the RM protocol. Here, the host device receives a host resource information request (profile_inq( ) APDU) from the security card (S902).

Upon receiving the request from the security card, the host device determines supportable network operating modes. When the host device supports only the Ethernet NIC (S904), the host device sets identification information of the newly defined IP communication resource to "TBD4" (S906). When the host device supports the Ethernet NIC and the OOB-mode downstream (FDC) (S908), the host device sets the IP communication resource identification information to "TBD5" (S910). When the host device supports the Ethernet NIC, the OOB-mode downstream (FDC), and the OOB-mode upstream (RDC) (S912), the host device sets the IP communication resource identification information to "TBD4" or "TBD5" and sets the low-speed communication resource identification information to "0x00605043" (S914).

A list of these resource identification values is set in the resource_identifier( ). The host device generates a profile_reply( ) APDU including the resource_identifier( ) (S916) and transmits the profile_reply( ) APDU to the security card through a data channel (S918).

FIG. 9B illustrates a procedure for receiving network operating mode information using the newly defined resource as shown in FIG. 7.

First, an interface (I/F) between the host device and the security card is initialized as described above (S920). The interface between the host device and the security card may be initialized when the host device boots or when the security card is inserted into the host device.

While the interface between the host device and the security card is initialized, resource information is transmitted and received according to the RM protocol. Here, the security card receives host resource information (profile_reply( ) APDU) from the host device (S922).

The security card parses the received profile_reply( ) APDU to acquire resource information included in the profile_reply( ) APDU (S924). The resource information may be included in a resource_identifier( ) in the profile_reply( ) APDU. When an IP communication resource included in the profile_reply( ) APDU has a value of "TBD4" (S926), the security card detects low-speed communication resource identification information (S928). When no low-speed communication resource identification information is present, the security card determines that the host device supports only the Ethernet NIC (S930). When the low-speed communication resource has a value of "0x00605043", the security card determines that the host device supports the Ethernet NIC, the OOB-mode downstream (FDC), and the OOB-mode upstream (RDC) (S936).

When the IP communication resource included in the profile_reply( ) APDU has a value of "TBD5" (S932), the security card detects low-speed communication resource identification information (S934). When no low-speed communication resource identification information is present, the security card determines that the host device supports the Ethernet NIC and the OOB-mode downstream (FDC) (S938) When the IP communication resource has a value of "0x00605043", the security card determines that the host device supports the Ethernet NIC, the OOB-mode downstream (FDC), and the OOB-mode upstream (RDC) (S936). When no IP communication resource identification information is present in the profile_reply( ) APDU, the network operating mode of the IP-mode is not supported and the network operating mode can be determined according to the low-speed communication resource identification information.

In this embodiment, a descramble module is included in a security card or a smart security card and the security card is detachably attached to the host device. A received broadcast signal is descrambled through the descramble module of the security card to be provided to the user. In another embodiment, a descramble module may be included in the host device without the security card and the descramble module may be designed to be downloaded from a broadcast station, a service provider, or the like. That is, the downloaded descramble module may be stored in a memory in the host device. However, this structural change does not limit the scope of the present invention.

Although the above description has been given with reference to examples where a network operating mode according to the IP mode has been added, information can also be transmitted and received according to the method described above when a network operating mode according to a mode other than the IP mode has been added. Terms or numbers described in the above embodiments are only examples that do not limit the spirit of the present invention.

What is claimed is:
1. A method of processing broadcast data, the method comprising:
    receiving resource information requesting a message from a Point of Deployment (POD);
    responding by a host device to the POD with a resource information message including a resource identifier indicating the host device supports an internet protocol (IP)-mode;

receiving an Ethernet frame including an IP packet which carries a first moving picture experts group (MPEG) transport stream (TS) packet from an external entity through an IP network;

routing the IP packet based on destination information included in the Ethernet frame;

extracting the first MPEG TS packet from the IP packet;

receiving a cable broadcast signal including a second MPEG TS packet through a cable;

demodulating the cable broadcast signal;

generating CableCARD MPEG Packets (CMPs) by appending a packet header to the first and second MPEG TS packet;

multiplexing the generated CMPs; and outputting the multiplexed CMPs to the POD.

2. The method of claim 1, wherein the resource identifier is an identifier defined for identifying a Low-Speed Communication resource.

3. The method of claim 2, wherein the resource identifier of the Low-Speed Communication resource is a resource for indicating whether the host device supports at least one of an Out of Band (OOB) down mode and an OOB up mode.

4. The method of claim 1, wherein the resource identifier is an identifier defined for identifying an IP communication resource which is used for supporting the IP-mode.

5. The method of claim 4, wherein the resource identifier of the IP communication resource further indicates whether the host device supports the OOB down mode.

6. A method of processing broadcast data, the method comprising:

receiving resource information requesting a message from a Point of Deployment (POD);

identifying whether a host device supports an internet protocol (IP)-mode;

inserting a resource identifier indicating the host device supports the IP-mode into a resource information message;

sending the resource information message to the POD;

receiving an Ethernet frame including an IP packet which carries a first moving picture experts group (MPEG) transport stream (TS) packet from an external entity through an IP network;

routing the IP packet based on destination information included in the Ethernet frame and extracting the first MPEG TS packet from the IP packet;

receiving a cable broadcast signal which carries a second MPEG TS packet through a cable;

demodulating the cable broadcast signal;

generating CableCARD MPEG Packets (CMPs) by appending a packet header to the first and second MPEG TS packet;

multiplexing the CMPs; and outputting the multiplexed CMPs to the POD.

7. The method of claim 6, wherein the resource identifier is an identifier defined for identifying a Low-Speed Communication resource.

8. The method of claim 7, wherein the resource identifier of the Low-Speed Communication resource further indicates whether the host device supports at least one of Out of Band (OOB) down mode and OOB up mode.

9. The method of claim 6, wherein the resource identifier is an identifier defined for identifying an IP communication resource which is used for supporting the IP-mode.

10. The method of claim 9, wherein the resource identifier of the IP communication resource further indicates whether the host device supports OOB down mode.

11. A host device interfacing with a Point of Deployment (POD), the host device comprising:

a controller configured to control to receive resource information requesting a message from the POD and respond with a resource information message including a resource identifier indicating the host device supports an internet protocol (IP)-mode;

an IP physical interface unit configured to receive an Ethernet frame including an IP packet which carries a first moving picture experts group (MPEG) transport stream (TS) packet through an IP network;

a routing engine configured to route the IP packet based on destination information included in the Ethernet frame;

a decapsulator configured to extract the first MPEG TS packet from the IP packet;

a broadband Interface unit configured to receive a cable broadcast signal which carries a second MPEG TS packet through a cable;

a demodulator configured to demodulate the cable broadcast signal; and a multiplexer configured to generate CableCARD MPEG Packets (CMPs) by appending a packet header to the first and second MPEG TS packet and multiplex the CMPs and output the multiplexed CMPs to the POD.

12. The host device of claim 11, wherein the resource identifier is an identifier defined for identifying a Low-Speed Communication resource.

13. The host device of claim 12, wherein the resource identifier of the Low-Speed Communication resource further indicates whether the host device supports at least one of an Out of Band (OOB) down mode and an OOB up mode.

14. The host device of claim 11, wherein the resource identifier is an identifier defined for identifying an IP communication resource which used for supporting the IP-mode.

15. The host device of claim 14, wherein the IP communication resource further indicates whether the host device supports the OOB down mode.

16. The method of claim 1, wherein the host device includes an IP physical interface for supporting the IP-mode.

* * * * *